United States Patent
Leidig et al.

(10) Patent No.: US 6,988,811 B2
(45) Date of Patent: Jan. 24, 2006

(54) OPTICAL EXPOSURE APPARATUS AND METHOD FOR ALIGNING A SUBSTRATE

(75) Inventors: Carl F. Leidig, Rochester, NY (US); David Kessler, Rochester, NY (US); Janet Donner, West Henrietta, NY (US); Rongguang Liang, Rochester, NY (US); Xiang-Dong Mi, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 11/042,044

(22) Filed: Jan. 24, 2005

(65) Prior Publication Data

US 2005/0140885 A1    Jun. 30, 2005

Related U.S. Application Data

(63) Continuation of application No. 10/194,750, filed on Jul. 12, 2002, now Pat. No. 6,874,899.

(51) Int. Cl.
 *F21V 9/14* (2006.01)
 *G02F 1/1337* (2006.01)

(52) U.S. Cl. .................. 362/19; 362/268; 349/124; 359/487

(58) Field of Classification Search ............. 362/19, 362/263, 264, 268; 349/124, 123, 128, 129, 349/130, 132, 125, 126, 127, 131; 359/487, 359/488; 250/365, 461.1, 504 R
See application file for complete search history.

(56) References Cited

U.S. PATENT DOCUMENTS 4,701,028 A    10/1987  Clerc et al. .................. 349/98
4,974,941 A    12/1990  Gibbons et al. ............... 349/27
5,389,698 A    2/1995   Chigrinov et al. ............. 522/2
5,410,422 A    4/1995   Bos .............................. 349/47
5,583,679 A    12/1996  Ito et al. ..................... 349/118
5,602,661 A    2/1997   Schadt et al. ................ 349/124
5,604,615 A    2/1997   Iwagoe et al. ............... 349/124
5,619,352 A    4/1997   Koch et al. .................... 349/89

(Continued)

FOREIGN PATENT DOCUMENTS

EP    1020739 A2    7/2000

(Continued)

OTHER PUBLICATIONS

Y. Satoh, H. Mazaki, E. Yoda, T. Kaminade, T. Toyooka, and Y. Kobori; Comparison of Nematic Hybrid and Discotic Hybrid Films as Viewing Angle Compensator for NW-TN-LCDs; SID 00 Digest, pp. 347-349, 2000.

(Continued)

*Primary Examiner*—John Anthony Ward
*Assistant Examiner*—Bao Q. Truong
(74) *Attorney, Agent, or Firm*—Nelson Adrian Blish

(57) ABSTRACT

A system for processing a multilayer liquid crystal film display material, with multiple irradiation apparatus (60) for applying a zone of polarized UV irradiation onto a substrate fed from a web (16) with incident light at a desired angle. Each irradiation apparatus (60) includes a UV light source (64), and one or more optional filters (82). A polarizer (90) is provided, sized and arranged to polarize light over the web (16) as it moves. The irradiation apparatus (60) employs an array of louvers (81) and/or a prism array (72). One irradiation apparatus (60) irradiates a first LPP1 layer (22) at a 0-degree alignment, in the web movement direction, the other irradiation apparatus (60) irradiates an LPP2 layer (26) with an orthogonal 90-degree alignment.

10 Claims, 13 Drawing Sheets

U.S. PATENT DOCUMENTS

| | | | | |
|---|---|---|---|---|
| 5,844,717 | A | * 12/1998 | Faris | 359/483 |
| 5,853,801 | A | 12/1998 | Suga et al. | 427/164 |
| 5,889,571 | A | 3/1999 | Kim et al. | 349/124 |
| 5,934,780 | A | 8/1999 | Tanaka | 362/19 |
| 5,936,691 | A | 8/1999 | Kumar et al. | 349/124 |
| 5,978,055 | A | 11/1999 | Van De Witte et al. | 349/119 |
| 6,061,138 | A | 5/2000 | Gibbons et al. | 356/400 |
| 6,160,597 | A | 12/2000 | Schadt et al. | 349/98 |
| 6,190,016 | B1 | 2/2001 | Suzuki et al. | 362/19 |
| 6,210,644 | B1 | 4/2001 | Trokhan et al. | 422/186.3 |
| 6,234,634 | B1 | 5/2001 | Hansen et al. | 353/20 |
| 6,243,199 | B1 | 6/2001 | Hansen et al. | 359/486 |
| 6,292,296 | B1 | 9/2001 | Choi et al. | 359/487 |
| 6,295,110 | B1 | 9/2001 | Ohe et al. | 349/124 |
| 6,307,609 | B1 | * 10/2001 | Gibbons et al. | 349/123 |
| 6,791,749 | B2 | * 9/2004 | DelPico et al. | 362/19 |

FOREIGN PATENT DOCUMENTS

| | | |
|---|---|---|
| EP | 1172684 B1 | 9/2003 |
| EP | 684500 B1 | 11/2004 |
| WO | WO 00/46634 | 8/2000 |

OTHER PUBLICATIONS

Sonek et al.; Appl. Opt. 22, pp. 1270-1271. May 1983.

M. Schadt, K. Schmitt, V. Kozinkov, and V. Chigrinov; Surface-Induced Parallel Alignment of Liquid Crystals by Linearly Polymerized Photopolymers; Jpn. J. Appl. Phys. vol. 31 (1992), pp. 2155-2164.

* cited by examiner

OPTICAL EXPOSURE APPARATUS AND METHOD FOR ALIGNING A SUBSTRATE

CROSS REFERENCE TO RELATED APPLICATIONS

This is a divisional of application Ser. No. 10/194,750, filed Jul. 12, 2002 now U.S. Pat. No. 6,874,899.

FIELD OF THE INVENTION

This invention generally relates to apparatus and methods for processing substrate materials using light exposure energy and more particularly relates to apparatus and methods for alignment of a liquid crystal display compensation film provided as a web-fed substrate.

BACKGROUND OF THE INVENTION

Current rapid expansion in liquid crystal display (LCD) applications is largely due to improvements in display performance. High contrast, good color reproduction, and stable gray scale intensities are important attributes for electronic displays that employ liquid crystal technology. With respect to contrast, a primary constraint with liquid crystal displays is the propensity for light leakage in the dark or "black" pixel state. Furthermore, the leakage and hence contrast of a liquid crystal display are also dependent on the angle from which the display screen is viewed. Typically, optimum contrast is obtained only within a narrow viewing angle, centered about the normal incidence to the display, and falls off rapidly as the viewing angle is increased. In color displays, light leakage not only degrades the contrast, but also causes undesirable color or hue shifts, degrading color reproduction. In addition to black-state light leakage, viewing angle constraints for typical twisted nematic liquid crystal displays are exacerbated by a shift in the brightness-voltage response as a function of viewing angle, due to the inherent optical anisotropy of the liquid crystal material.

Thus, one of the major factors that determine the quality of LCD displays is the viewing angle characteristic, which describes the change in contrast ratio relative to different viewing angles. It is desirable that contrast be maintained over a wide range of viewing angles, a known shortcoming with liquid crystal display devices. One way to improve the viewing angle characteristic is to insert a compensator (also referred as compensation film, retardation film, or retarder) with proper optical properties between the polarizer and liquid crystal cell, such as disclosed in U.S. Pat. Nos. 5,583,679; 5,853,801; 5,619,352; 5,978,055; and 6,160,597. Compensation film according to U.S. Pat. Nos. 5,583,679 and 5,853,801, based on discotic liquid crystals which exhibit negative birefringence, is widely used. This film offers improved contrast over wider viewing angles; however, it suffers larger color shift for gray level images, compared to a compensator made of liquid crystalline materials having positive birefringence, according to Satoh et al. ("Comparison of Nematic Hybrid and Discotic Hybrid Films as Viewing Angle Compensator for NW-TN-LCDs", *SID 2000 Digest*, pp. 347–349, (2000)). To achieve comparable contrast ratio while reducing color shift, one compensation film solution uses a pair of liquid crystal polymer films (LCP), having orthogonally crossed optical axes, disposed on each side of a liquid crystal cell, as discussed by Chen et al. ("Wide Viewing Angle Photoaligned Plastic Films", *SID 99 Digest*, pp. 98–101 (1999)). This paper states that "since the second LPP/LCP retarder film is coated directly on top of the first LCP retarder film, the total thickness of the final wide-view retarder stack is only a few microns thin." Although such a method provides a very compact optical component, it is difficult to manufacture a compensation film having two LCP layers whose optical axes are orthogonally oriented. This is a particular challenge where the film substrate is web-fed, such as in a continuous, roll-to-roll manufacturing process.

In processing liquid crystal compensation films, photo-alignment methods are recognized to have advantages over earlier rubbing alignment methods. Using photo-alignment, a thin alignment medium, typically linear photo-polymerization media (LPP) is applied to a substrate and is then irradiated, typically using UV light, to provide a directional alignment bias. There are a number of photo-alignment methods, based on different photoreaction processes. In general, a photo-alignment method may be one of three basic types:

(1) Isomerization, as disclosed in U.S. Pat. No. 4,974,941 is a reversible process using laser light irradiation in which a monomer or single molecule is aligned using cis-trans-isomerization effects;

(2) Photo-dimerization, as disclosed in U.S. Pat. No. 5,602,661 employs photo-induced orientation and dimerization of polymer side-chains, including cross-linking; and (3) Photo-dissociation uses light to anisotropically alter an alignment medium such as polyamic acid or polyimide or copolymer comprised of amic acid and imide.

In one promising photo-dimerization method, discotic liquid crystal structures within a liquid crystal polymer (LCP) layer are applied over an LPP layer to take the preferred alignment direction. Most solutions for photo-alignment using this method direct collimated polarized UV light, at an oblique angle, onto an alignment LPP substrate to align polymer molecules in a desired direction that provides a pretilt for a subsequently applied LCP layer containing liquid crystal structures. It has been found that, for suitable performance, only a fraction of molecules in the LPP alignment layer need to be photopolymerized. Typical LCP media include diacrylates and diepoxides and similar cross-linkable liquid crystalline materials. LCPs may have inherent positive optical anisotropy, such as with diacrylates, or negative anisotropy and weak biaxial properties, such as with discotic liquid crystal materials.

A number of different photo-alignment media and techniques have been used to provide the necessary pretilt for different types of liquid crystal display media. For a suitable class of LPP media, optical apparatus that provides irradiation for alignment must meet the following criteria:

1. Exposure levels of 10–15 $mJ/cm^2$, nominal.
2. Narrow range of wavelengths. The exact range that is suitable for alignment irradiation depends on the material. UV-B (280–320 nm) is the preferred range for many types of alignment substrate. Some wavelengths are preferably rejected in order to minimize unwanted effects on alignment or undesirable temperature effects. Rejection of unwanted wavelengths is especially important for efficiency in a roll-to-roll manufacturing apparatus in which a web of substrate traveling at hundreds of feet per minute is processed. At such high speeds, the necessary increase in radiation at desirable wavelengths can easily bring with it an increase in undesirable radiation levels from other parts of the spectrum. For example, UV light is efficiently produced by a class of lamps that excite mercury or ion-doped mercury molecules. Such lamps typically generate UV-C (200–280 nm), UV-B (280–320 nm), UV-A (320–400 nm), visible light, and infrared light. For an embodiment where UV-B is chosen as the preferred spectral range, it would be desirable to limit the irradiance and total exposure on the web from other parts of the spectrum.

3. Uniform exposure dosage. Exposure dose is expressed in terms of energy per unit area. It has been found that dosage levels, alternately termed exposure levels, can provide acceptable alignment results even where dosage varies by as much as +/−50% across the irradiated surface area in some applications. However, reasonable compensation for dosage uniformity helps to obtain uniform alignment results, minimizing intensity level variations between levels at the middle of a substrate and at substrate edges.

4. Uniform direction of polarization. It does not appear to be important that the applied alignment radiation be highly polarized. However, for a class of LPP materials, best results are achieved when the exposure radiation has a highly uniform direction of polarization. For maintaining a high standard of quality and uniform alignment, it is preferable to provide a consistent direction of polarization, varying no more than 1 degree over the full irradiated surface. Of course, the problem of maintaining this tolerance for directional uniformity of polarization is accentuated when irradiating a large scale surface.

5. Oblique incident angles for pretilt. Typically, some deviation from normal incidence to the media is required in order to provide the necessary pretilt angle to the LPP material. For most applications, a broad range of incident angles, such as over a 10–70 degree range, is permissible. We will refer to this illumination as illumination with predetermined inclination where it is understood that the inclination refers to the average angle of the multiplicity of incident angles rather then a single angle of illumination.

There have been some conventional systems developed that generally meet most of requirements 1–5 above for irradiating alignment media on a small scale. However, it can be appreciated that these requirements become particularly difficult to meet as the irradiated surface area, or exposure zone, increases. Conventional solutions are as yet poorly suited to the demands for efficiently irradiating a web-fed substrate, where the substrate is moved past the irradiation device at production speeds and the web width exceeds 1 m.

In addition to the requirement for large scale photo-alignment processing, there is also a need to provide a film having composite LPP/LCP structures in which two alignment surfaces have been treated so that their respective optical axes are close to 90 degrees, that is, orthogonal, with respect to each other. Conventional approaches have not yet provided a suitable solution for achieving this with a web-fed media.

Among proposed prior art solutions for photo-alignment are a number of scanning solutions:

U.S. Pat. No. 5,889,571 discloses an irradiation device for scanning linearly polarized UV across a substrate to achieve alignment layer uniformity. U.S. Pat. No. 5,889,571 emphasizes the importance of oblique radiation. This solution is best suited to a substrate provided in sheet form rather than to a substrate continuously fed from a web.

U.S. Pat. No. 6,295,110 discloses a laser light-based system for applying polarized UV radiation across a substrate. Designed for substrates having a diagonal in the range of about 10 inches or slightly larger, the U.S. Pat. No. 6,295,110 solution provides two-dimensional irradiation over an area that exceeds the size limit for the type of optical radiation employed. However, there are practical limitations in scaling this type of solution to suit a web-fed substrate having a width dimension of 1 m or larger.

It has been noted that high irradiance conditions would be beneficial for use in high-speed roll-to-roll manufacturing apparatus, particularly where it is desirable to provide a compact system. Peak irradiance on the web in such environments could range from approximately 50 milliwatts/cm$^2$ to values of several hundred milliwatts/cm$^2$. This means that average irradiance on any polarizer would be much higher. With irradiance over ranges such as might be supplied using a medium pressure long-arc Mercury lamp at power levels in the 100–600 W range, conventional, resin-based polarizers would not be well-suited. For example, this type of irradiation exceeds the practical working range of polarizers such as HNP'B—Linear Polarizer from 3M (St. Paul, Minn.). Sheet polarizers are not generally capable of handling higher irradiation levels and may quickly deteriorate over a prolonged exposure period. With this limitation in mind, prior art solutions for providing polarized irradiation over a large area include the following:

U.S. Pat. No. 6,190,016 discloses an irradiation apparatus using an oval focusing mirror, integrator lens, and polarizer disposed at various points in the optical system. U.S. Pat. No. 6,190,016 emphasizes the value of collimated light, incident to a polarizer, to improve polarization performance. The use of Brewster plate polarizers for large scale surfaces is disclosed.

U.S. Pat. No. 5,934,780 discloses an exposure apparatus using a UV light source having an oval focusing mirror, where the apparatus includes an integrator lens, polarizer, and collimation optics. Brewster plate polarizers are used in the preferred embodiment. This type of solution may work well for a substrate up to a certain size. However, there are practical size limitations that constrain the use of Brewster plate polarizers for large substrates. Similarly, EP 1 020 739 A2 discloses a modified Brewster plate arrangement. As a variation on Brewster plate polarizers, EP 1 172 684 discloses a modified V-shaped Brewster's angle arrangement. However, similar weight and size constraints also limit the feasibility of this type of solution.

U.S. Pat. No. 6,292,296 discloses a large scale polarizer comprising a plurality of quartz segments disposed at Brewster's angle, used for system that irradiates using UV. However, such an arrangement would be very costly and bulky, particularly as a solution for a web-fed exposure system with a large irradiation area.

As the above-noted patent disclosures show, irradiation apparatus designed for large exposure zones have employed sizable polarization components, typically quartz or glass plates disposed at Brewster's angle. Hampered by the relative size and weight of these polarizers, such irradiation apparatus are necessarily less efficient in delivering light energy to the exposure surface. Moreover, conventional polarizers using Brewster plates or interference polarizers based on Brewster's angle principles also exhibit a high degree of angular dependency. That is, incident light must be substantially collimated in order to obtain a uniform polarized light output.

Significantly, Brewster plate polarizers such as those shown in the U.S. Pat. No. 5,934,780 and U.S. Pat. Nos.

6,061,138 and 6,307,609 are not optimal for providing a uniform polarization unless highly collimated light is used. With respect to an irradiated surface, the principal axis of polarization of the Brewster plate polarizer is uniform only when the plane of the Brewster plates is within a very limited range of angles. Otherwise, the Brewster plate polarizer does not have a well-defined, uniform principal axis of polarization. With Brewster plate polarizers, the direction of polarization is dependent upon the angular direction of incoming light. For each beam direction, a specific local coordinate system, aligned with the meridional plane containing incident and outgoing beams, is established at the point of incidence, as is shown in FIGS. 16a and 16b. Thus, when there are several incoming beams at different angles, the Brewster plate polarizer correspondingly provides multiple polarization directions, that is, multiple polarization axes. Moreover, the Brewster plate polarizer operates in one direction only; it would not be practical to use Brewster plate polarizers for achieving orthogonal polarization of multiple LPP alignment layers on a web-fed substrate. Instead, in order to provide orthogonal alignment of overlapping LPP layers, it would be necessary to expose individual cut sheets of media, rotating the media to obtain orthogonal exposure. Brewster plate solutions are not compact or practical for use with long-arc lamps, particularly where orthogonal exposure directions must be obtained.

Referring to FIGS. 16a and 16b, there is shown, for a Brewster plate polarizer 132, how a principal axis of polarization 126 varies with incident beams 124 at different angles. As is shown in these figures, a meridional plane 130 is defined by incident beam 124, a reflected beam 120, and a transmitted beam 122. Principal axis of polarization 126 has a variable angle $\psi_1$ or $\psi_2$ relative to a reference direction 128 depending on the incident angle of incident beam 124. Viewed geometrically, a tilt of meridional plane 130 results in a change to principal axis of polarization 126.

In contrast, conventional sheet polarizers have the property of providing a uniform principal axis of polarization for light from within a range of incident angles. Sheet polarizers are also capable of being rotated to allow orthogonal alignment exposure such as would be required in a continuous web-based manufacturing process. However, sheet polarizers are not robust under conditions of high UV light irradiance and would deteriorate rapidly. Thus, it can be seen that it is difficult to obtain efficient polarization of UV-B light (280–320 nm) at relatively high irradiance levels and for incident light at relatively wide angles of incidence using conventional polarization components and techniques.

Conventionally, wire grid polarizers have been used in infrared and longer-wavelength applications. More recently, wire grid polarizers have been developed for use with visible light, as disclosed in U.S. Pat. Nos. 6,234,634 and 6,243,199. Although the concept of wire grid polarizers for UV applications had been experimentally demonstrated in 1983 (see Sonek et al. *Appl Opt.* 22, pp. 1270–1271; where evaporated aluminum was spaced at 115 nm on quartz substrate to cover a wavelength range of approximately 200–800 nm), only recently have wire grid polarization devices been commercially available for use with light in the UV range. Wire grid polarizers have inherent advantages in high-heat and high-irradiance applications where conventional sheet polarizers would not be suitable. Wire grid polarizers are also inherently less angularly dependent than other types of polarizers, particularly Brewster plate and interference type polarizers. Advantageously, wire grid polarizers have a low dimensional profile, allowing them to be used to replace sheet polarizers where space along the optical axis may be minimal. In addition, wire grid polarizers exhibit favorable response, similar to that available with sheet polarizers as noted above, with respect to principal axis of polarization. As is shown, for example, in FIGS. 16c and 16d, wire grid polarizers 134 provide a principal axis of polarization 126 that is fairly uniform with respect to a reference direction 128 when incident beams 124 have a range of incident angles. This capability means, for example, that wire grid polarizer 134 can be tilted with respect to incident beam 124 without a corresponding change in principal axis of polarization 126. In this way, principal axis of polarization 126 of wire grid polarizer 134 is independent of the angle of incidence of incident beams 124, over a broad range of angles. However, wire grid polarization devices are not dimensionally scaled to suit the requirements of applying polarized light over a large exposure zone.

Alternatively, the Beilby-layer polarizer, commercially available from Sterling Optics (Williamstown, Ky.), has desirable properties for efficiently polarizing light in the UV spectrum. This type of polarizer uses an azo-dye applied and fixed to a uni-directionally polished plate of fused silica. The subsequent angular acceptance angle for the Beilby-layer exceeds that of either commercially available interference filters, Brewster plates, or UV wire grid polarizers, and surface resilience to high heat or irradiance is superior to that of resin-based sheet polarizers. The Beilby-layer polarizer also exhibits a low dimensional profile and a favorable response with respect to principal axis of polarization.

A number of different types of light sources for photo-alignment have been disclosed, for example:
    WO 00/46634 discloses a method for alignment of a substrate using an unpolarized or circularly polarized source, applied in an oblique direction.
    U.S. Pat. No. 4,974,941 discloses alignment and realignment, preferably using a laser source.
    U.S. Pat. No. 5,389,698 discloses use of linearly polarized UV for photopolymer irradiation. Similarly, U.S. Pat. No. 5,936,691 discloses use of linearly polarized UV for photopolymer irradiation, with the UV source positioned close to the substrate surface.

As noted above, the use of collimated or substantially collimated light is, in large part, dictated by polarizer characteristics. In related exposure processing applications, collimated light is considered advantageous, as in these examples:
    U.S. Pat. No. 5,604,615 and EP 0 684 500 A2 disclose forming an alignment layer by directing collimated UV through slits in a photomask.
    In a related curing application, U.S. Pat. No. 6,210,644 discloses directing UV through slatted collimator for curing resin.
    U.S. Pat. Nos. 6,061,138 and 6,307,609 disclose a method and apparatus for alignment using exposure radiation that is "partially polarized" and "partially collimated." By "partially polarized," this disclosure identifies a broad range of S:P values from 1:100 to 100:1 with preferred range from 0.5:1 to 30:1. By "partially collimated" these disclosures identify a broad range with a divergence, in one direction, greater than about 5 degrees and less than about 30 degrees. The use of such broad ranges simply seems to indicate that some significant degree of variability is acceptable for both polarization and collimation. Indeed, in practice, most polarizers work within the broad range stated in U.S. Pat. No. 6,061,138, particularly over sizable exposure zones. As is generally well known and shown in the disclosure of U.S. Pat. No. 6,190,016, some degree of collimation is needed simply for consistent control of polarization. Partial collimation, over the broad ranges stated in U.S. Pat. No. 6,061,138 occurs when light simply passes through an aperture and is not otherwise blocked, focused, projected, or diffused. Baffles or apertures that block stray light necessarily perform "collimation" within the ranges given in the U.S. Pat. No. 6,061,138. Earlier work, disclosed in U.S. Pat. No. 5,934,780 similarly shows use of partially collimated light having relatively poor polarization and the use of relatively high incident angles for exposure energy, covering the ranges specified in the U.S. Pat. No. 6,061,138. Another earlier patent, EP 0 684 500 A2, states that collimation of the irradiating polarized light beam is preferable, but does not require collimation.

Thus, prior art seems to indicate that collimation, considered by itself, is not as important as other characteristics of exposure radiation. Certainly, some degree of collimation is inherently necessary in order to efficiently collect and direct light onto a substrate, taking advantage of the light emitted in all directions by using devices such as using reflective hoods, for example. As is noted above, some degree of collimation is necessary for polarizing light, since polarization devices are not typically equipped to handle wide variations in incident light divergence. But, taken in and of itself, collimation may have secondary importance relative to other properties of the exposure light.

In contrast, maintaining a consistent polarization direction or azimuthal angle appears to be very important for obtaining good results. The direction of polymerization or selection for LC alignment materials closely corresponds to the direction of polarization. In fact, there is evidence that partial polarization, as suggested by U.S. Pat. No. 6,061,138 and as exhibited in earlier work disclosed by Schadt et al. ("Surface-Induced Parallel Alignment of Liquid Crystals by Linearly Polymerized Photopolymers" *Japanese Journal of Applied Physics*, Vol. 31, 1992, pp. 2155–2164) appears to be acceptable, provided that a consistent direction of polarization is maintained. The disclosure of U.S. Pat. No. 5,934,780 emphasizes the importance of this direction of polarization. It has been shown that optimal results are obtained over the exposure zone when the exposure energy is somewhat uniformly distributed and when the direction of polarization is tightly controlled to within about 1 degree.

As is shown in the prior art solutions cited above, achieving polarization over a broad exposure zone, with a tightly controlled direction of polarization, is particularly difficult with high intensity UV-B radiation. It is difficult to obtain a UV-B source that provides polarized UV-B light at reasonable cost. Moreover, high heat and irradiance requirements place considerable demands on filtering and polarization components. Conventional resin-based sheet polarizers are unlikely to withstand the elevated irradiance and high heat conditions. Brewster plates and interference filters can withstand these conditions but have size and weight disadvantages as well as acceptance angle constraints.

As a further complication, controlling the intensity of radiation energy has been proven to be difficult to achieve and to maintain as a web of material is exposed. Obtaining a uniform dosage distribution from a linear light source requires some means for redirecting the energy applied so that the intensity at the edges of the illuminated surface is not appreciably different from that at the center of the surface. While tolerances may not be critical, some reasonable degree of uniformity appears to be desirable.

Cost-effective mass manufacture of LC material requires high throughput. This necessitates using sufficient intensity levels, consistently applied to a material that is exposed and cured at fast speeds. Although conventional solutions provide some capability for high-volume web-fed manufacture, there is clearly room for improvement in processing speed, cost, and quality over prior art approaches.

It can be appreciated that there would be benefits to manufacturing apparatus and methods for fabrication of a compensation film having orthogonally disposed optical properties. Such a film would enhance the viewing angle performance liquid crystal displays, for display technologies including Twisted Nematic (TN), Super Twisted Nematic (STN), Optically Compensated Bend (OCB), In Plane Switching (IPS), and Vertically Aligned (VA) liquid crystal displays. These various liquid crystal display technologies are described in U.S. Pat. Nos. 5,619,352; 5,410,422; and 4,701,028. Conventional approaches do not provide a suitable solution for mass-manufacture fabrication of such a compensation film.

Thus, it can be seen that there is a need for improved apparatus and methods for fabricating a liquid crystal display compensation film provided as a web-fed substrate, where the film comprises two orthogonally oriented alignment layers.

SUMMARY OF THE INVENTION

It is an object of the present invention to provide an apparatus and method for irradiating a liquid crystal substrate with polarized radiation having substantially uniform exposure and a highly uniform direction of polarization. With this object in mind, the present invention provides an optical exposure apparatus for forming an alignment layer onto a web-fed substrate, the apparatus comprising:

(a) an irradiation apparatus for directing an incident ultraviolet light toward the substrate at a predetermined average angle of inclination, over an exposure zone spanning the full width of the substrate, comprising:
  (a1) a light source for providing said incident ultraviolet light;
  (a2) light directing means for directing said incident ultraviolet light at said predetermined average angle of inclination relative to the substrate surface; and
(b) a polarizer disposed between said light directing means and the substrate and rotatably oriented to maintain a principal axis of polarization having a predetermined orientation with respect to the web movement direction, said principal axis of polarization independent of said angle of inclination.

From another aspect the present invention provides a method for fabricating a multilayer web-fed substrate having a first liquid crystal film layer aligned along a first optical axis and a second liquid crystal film layer aligned along a second optical axis orthogonal to said first optical axis, the method comprising:

(a) applying a first alignment layer to the substrate to form a multilayer film;
(b) irradiating said first alignment layer with incident ultraviolet light directed through a first polarizer having a first principal axis of polarization at a first angle relative to the surface of the multilayer film to provide alignment in a first direction;
(c) applying a second alignment layer to said multilayer film; and
(d) irradiating said second alignment layer with incident ultraviolet light directed through a second polarizer having a second principal axis of polarization at a second angle relative to the surface of the multilayer film, said second angle orthogonal to said first angle to provide alignment in a second direction.

It is a feature of the present invention that it directs, over a large irradiation zone, polarized light having a very uniform direction of polarization. The present invention is capable of directing linearly polarized light, uniform with respect to direction of polarization to within 1 degree, over an exposure zone having a width in excess of 1 m.

It is an advantage of the present invention that it provides an irradiation apparatus that can be adapted to expose in one of a number of polarization directions. Using this feature, a first irradiation apparatus irradiates a substrate with polarized light having a first polarization direction and a second irradiation apparatus, similar in structure and composition to the first irradiation apparatus, but arranged at a different angle and having a different number and configuration of supporting prisms or louvers, irradiates a substrate with polarized light having a second polarization direction, orthogonal to the first direction.

It is a further advantage of the present invention that it provides UV light having a highly consistent direction of polarization, while maintaining a relatively uniform irradiation over a broad exposure zone. Consistent, uniform polarization direction over this exposure zone is provided without the need for collimated light.

It is a further advantage of the present invention that it provides a system capable of continuous, in-line processing of a web-fed substrate having a plurality of alignment layers that are orthogonally aligned with respect to each other.

It is a further advantage of the present invention that by allowing the illumination source to be disposed near the substrate surface it provides improved energy efficiency over prior art photo-alignment systems.

It is a further advantage of the present invention that it provides a relatively compact apparatus for irradiation over a large exposure zone.

It is a further advantage of the present invention that it allows a number of irradiation apparatus to be combined in sequence in order to boost processing speed.

It is a further advantage of the present invention that it provides an improved contact-free and dust-free method for forming an alignment layer within a liquid crystal substrate.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

The Processing System

Figure 1:
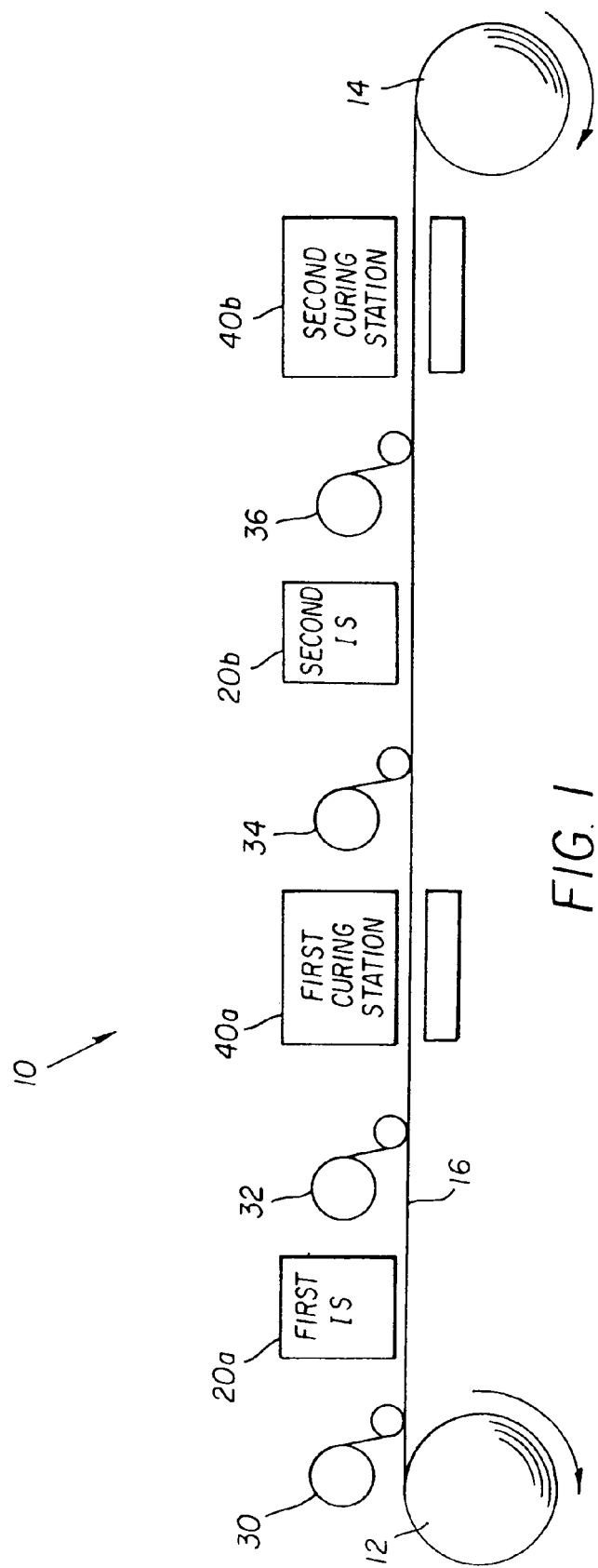
FIG. 1 is a schematic block diagram showing a system of the present invention for processing a multilayer web of liquid crystal compensation film.

Referring to FIG. 1, there is shown a processing apparatus 10 for a preferred embodiment of the present invention for processing a source roll 12 of transparent substrate, fed as a web 16 represented as moving from left to right in FIG. 1, to provide a finished goods roll 14. In the preferred embodiment, finished goods roll 14 is a liquid crystal display compensation film, fabricated as web 16 built up from multiple layers of material, with the components shown in FIG. 2. These materials are linear photo-polymerization media (LPP) and liquid crystal polymer media (LCP).

Figure 2:
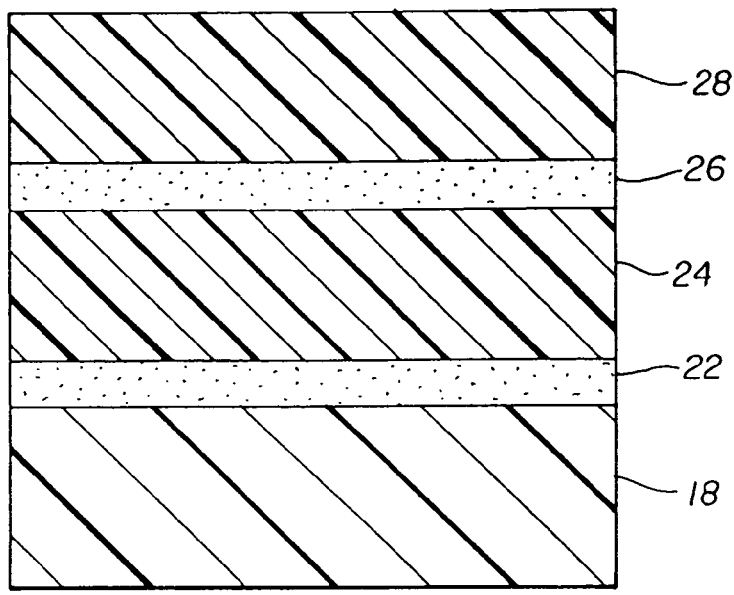
FIG. 2 is a cross-section view showing media layers of the compensation film processed using the apparatus of the present invention.

Referring now to both FIGS. 1 and 2, a clear substrate layer 18 is provided on source roll 12. In a preferred embodiment, clear substrate layer 18 is made of triacetyl cellulose. An LPP1 layer 22 is added at an LPP1 layer application station 30. A first irradiation station 20a treats LPP1 layer 22 to provide a predetermined molecular arrangement, crosslinking polymers to obtain optical alignment with a preferred tilt angle. Then, an LCP1 layer 24 is affixed to treated LPP1 layer 22 at an LCP1 layer application station 32. A first curing station 40a cures LCP1 layer 24 on top of LPP1 layer 22. Next, an LPP2 layer 26 is applied at an LPP2 layer application station 34. Similarly, LPP2 layer 26 is treated at a second irradiation station 20b to provide alignment that, in the plane of web 16, is orthogonal to the molecular arrangement provided to LPP1 layer 22. Finally, an LCP2 layer 28 is applied at an LCP2 layer application station 36 and cured at a second curing station 40b. The manufactured compensation film is then wound onto finished goods roll 14.

Using the process shown for processing apparatus 10, continuous, web-based manufacture of a liquid crystal display media or other material can be performed, without the need for cutting individual sheets from a continuous roll. In the processing described, LPP layers are very thin, on the order of approximately 50 nm.

In a preferred embodiment, web 16 is relatively wide, with widths exceeding 1 m. For treating LPP1 layer 22 and LPP2 layer 26, irradiation stations 20a and 20b provide linearly polarized UV-B irradiation, nominally 280–320 nm. Exposure doses are provided at levels near 10–15 mJ/cm$^2$. Exposure uniformity within +/−30% is needed in order to prevent "hot spots" at midpoints in the width of web 16 and to spread the exposure energy sufficiently to the sides of web 16. Most important for proper treatment of LPP1 layer 22 and LPP2 layer 26 is providing polarized light having a very consistent direction of polarization, within 1 degree at any point on web 16.

Curing stations 40a and 40b apply some form of radiant energy suitable for curing LCP1 layer 24 and LCP2 layer 28. Preferably, UV-B wavelengths are avoided to minimize the impact of curing operation on LPP1 layer 22 and LPP2 layer 26 once treated. In a preferred embodiment, UV-A wavelengths are used for curing. Some filtering of unwanted wavelengths, such as IR and visible light, is preferred, both at first and second irradiation stations 20a and 20b and at first and second curing stations 40a and 40b.

Figure 3:
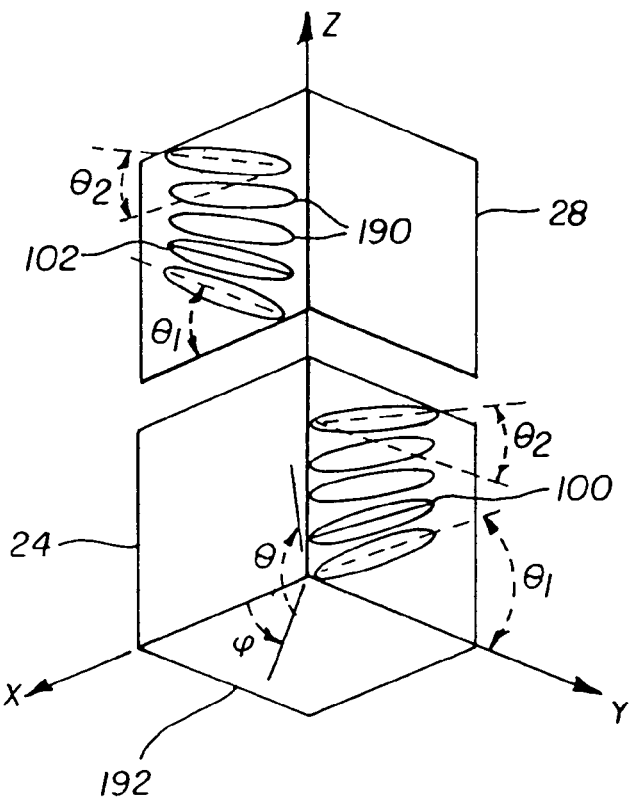
FIG. 3 is a perspective view showing key geometrical relationships of structures within compensation film layers.

Referring to FIG. 3, there is shown a 3-dimensional geometric representation of LCD layer alignment, relative to an XYZ coordinate system. In the upper section of FIG. 3, the orientation of discotic liquid crystal structures 190 is shown for LCP2 layer 28. The lower section of FIG. 3 shows orientation for LCP1 layer 24. Optic axes 100 and 102 are indicated for LCP1 layer 24 and LCP2 layer 28 respectively. For each LCP1 layer 24 and LCP2 layer 28, alignment processing arranges discotic structures 190 so that optic axes 100 and 102 each have an appropriate tilt angle θ and and/or azimuthal angle φ. Azimuthal angle φ is in an XY plane of substrate 192, from the X axis, parallel to web 16 within the exposure zone of irradiation station 20a or 20b of FIG. 1. Tilt angle θ is in the Z direction, up from the origin. Optic axes 100 and 102 should be orthogonal with respect to each other, within a tolerance of a few degrees.

Azimuthal angle φ of optic axis 100, 102 is, in part, a factor of dopant in the anisotropic LCP material. Tilt angle θ is, in large part, a factor of the incident light angle, exposure dose, and polarization and can vary somewhat over a range from $\theta_1$ to $\theta_2$. Obtaining a quality compensation film is, then, dependent on maintaining a suitable incident angle, proper exposure dosage, and uniform polarization characteristics.

In a preferred embodiment, the orthogonal directions of tilt angle orientation are as follows: a 0-degree orientation is provided substantially parallel to the direction of web movement; a 90-degree orientation is provided orthogonal to the 0-degree orientation, substantially in the cross-web direction. With this distinction in mind, subsequent description refers to 0-degree and 90-degree configurations. It must be observed, however, that the apparatus and methods of the present invention can be readily adapted to other orthogonal alignment arrangements. For example, a crossed 45-degree alignment arrangement could be fabricated, providing orthogonal alignment to multiple layers using the apparatus and method of the present invention.

Apparatus for Irradiation

Figure 4:
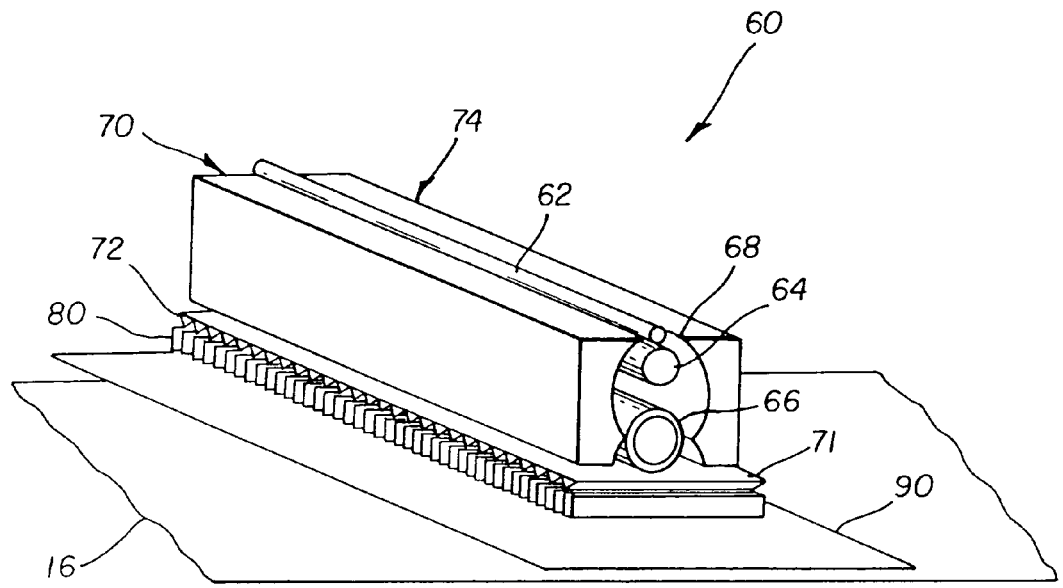
FIG. 4 is a perspective view of an irradiation apparatus according to the present invention.

Referring to FIG. 4, there is shown an irradiation apparatus 60 as used, with variations, within irradiation stations 20a and 20b to apply UV light over an irradiation zone onto web 16. Irradiation apparatus 60 comprises a hood assembly 70 that generates and directs source radiation across the full width of web 16 and a light conditioning assembly 74 for controlling light divergence, for directing light with the desired incident angle, and for polarizing this source radiation. Within hood assembly 70, a light source 64 provides source radiation at the preferred wavelength and power levels. Cooling is provided, such as by a cooling tube 66 or other device. Cooling tube 66 could be air- or water-cooled, for example. An air tube 62 may also be provided for cooling purposes. Cooling tube 66 also provides some amount of UV-C and IR filtering.

As part of light conditioning assembly 74, a prism array 72 is disposed in the radiation path. Prism array 72 helps to reduce the divergence angle of light along the length of irradiation apparatus 60. An optional coating 71 may be provided such as to prevent UV-B reflection, for example. A louver array 80 is then disposed below prism array 72. As is described subsequently, louver array 80 also helps to reduce the divergence angle and to direct light in an intended direction toward the surface of web 16. Finally, a polarizer 90 provides the necessary amount of polarization for exposure irradiation, as is also described subsequently.

Light source 64 could be, for example, an Hg medium pressure long arc lamp, such as those available from Nordson Corporation, Amherst, Ohio, for example.

FIG. 4 shows one configuration of irradiation apparatus 60. As is described subsequently, different arrangements of support components such as prism array 72 and louver array 80 are provided for 0- and 90-degree configurations.

Figure 5:
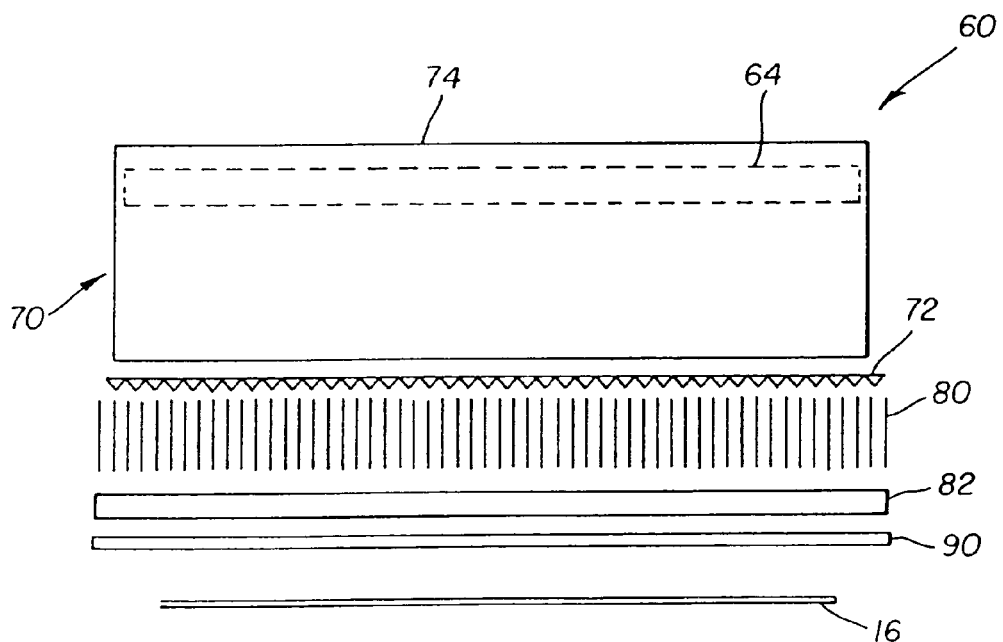
FIG. 5 is an exploded front view of an irradiation apparatus, showing one configuration of components.

Referring to FIG. 5, there is shown an exploded front view of irradiation apparatus 60. Additional components visible from this view include a filter 82. In a preferred embodiment, filter 82 comprises one or more fused silica plates, having high reflectance to visible and UV-A light.

Irradiation station 20a or 20b may house more than one irradiation apparatus 60. By using a number of irradiation apparatus 60 in series, first or second irradiation station 20a or 20b can provide additional exposure dosage capacity, effectively providing a wider exposure zone, enabling accelerated processing by processing apparatus 10.

0- and 90-Degree Configurations for Irradiation Apparatus 60

As noted above, first irradiation station 20a may have one or more irradiation apparatus 60 for providing alignment in one direction. Likewise, second irradiation station 20b may also have more than one irradiation apparatus 60 for providing alignment in a second, orthogonal direction. The deployment of multiple irradiation apparatus 60 units increases the available exposure dosage for treating the LPP medium. Slightly different configurations of irradiation apparatus 60 are used for the 0-degree and 90-degree configurations used within first and second irradiation stations 20a and 20b respectively. However, only minor modifications are needed to adapt irradiation apparatus 60 for the 0-degree or for the 90-degree configuration.

Figure 6A:
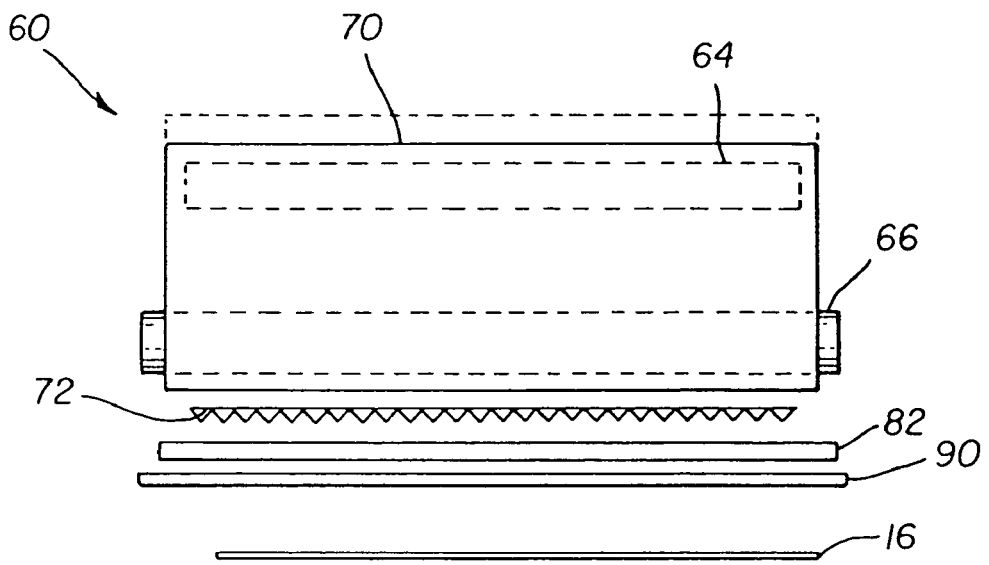
FIG. 6a is a front view of a irradiation apparatus for a 0-degree configuration.
Figure 6B:
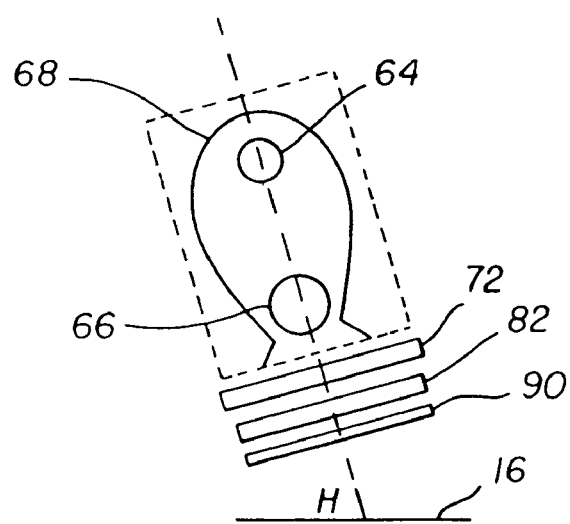
FIG. 6b is a cross-sectional side view of an irradiation apparatus for a 0-degree configuration.

Referring to the front view of FIG. 6a and corresponding side view of FIG. 6b, there is shown the configuration of irradiation apparatus 60 for the 0-degree configuration used within first irradiation station 20a. With respect to the view of FIG. 6a, web 16 movement direction is out from the page. Referring to the corresponding side view of FIG. 6b, irradiation apparatus 60 is tilted at an angle H relative to the surface of web 16. This tilt could be obtained by tilting irradiation apparatus 60 or by routing web 16 at an oblique angle relative to irradiation apparatus 60. This arrangement provides exposure light at the optimum incident angle for obtaining 0-degree alignment. A reflector 68 is positioned along the length of light source 64, collecting and redirecting light emitted from light source 64.

Figure 7A:
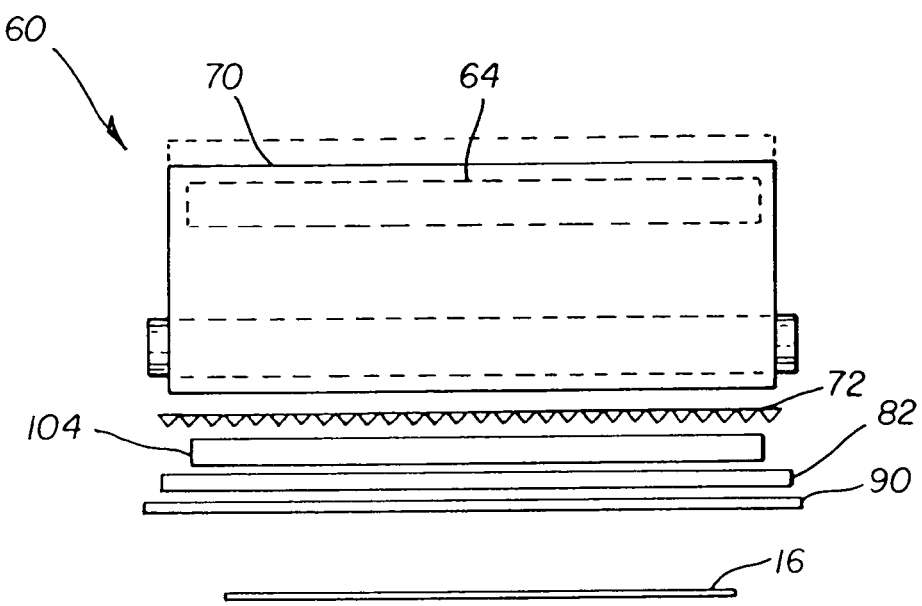
FIG. 7a is a front view of a irradiation apparatus for a 90-degree configuration.
Figure 7B:
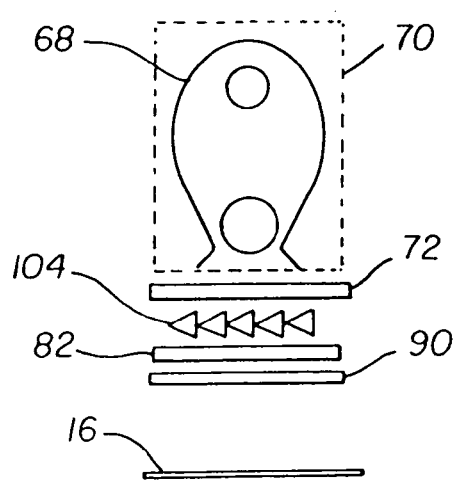
FIG. 7b is a cross-sectional side view of an irradiation apparatus for a 90-degree configuration.
Figure 8A:
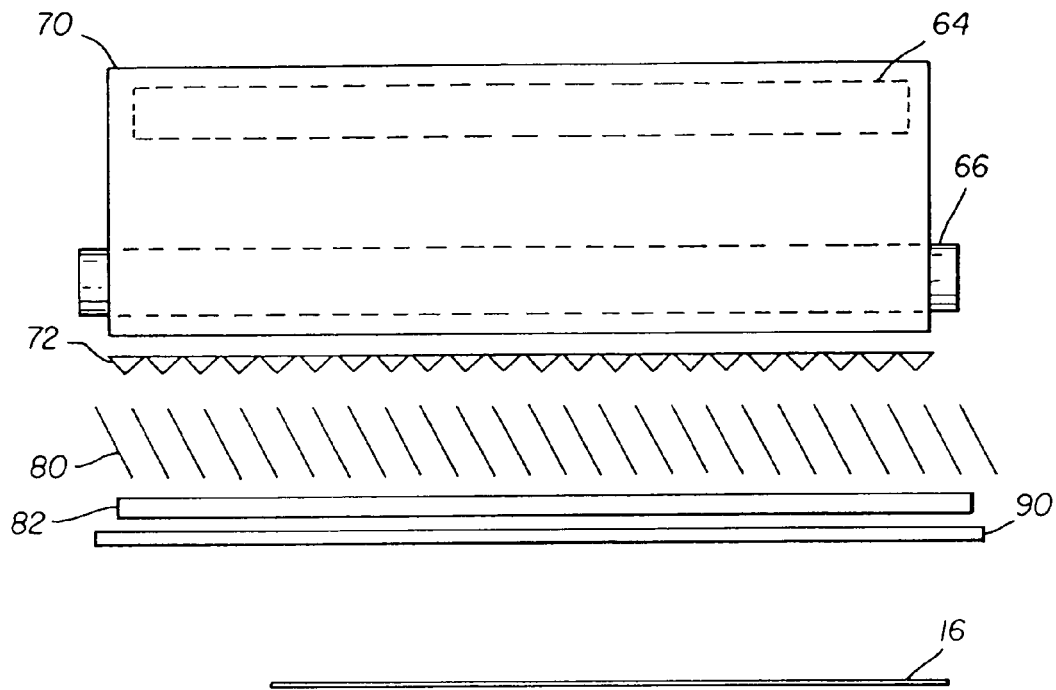
FIG. 8a is a front view showing a louver array when in the 90-degree configuration.
Figure 9:
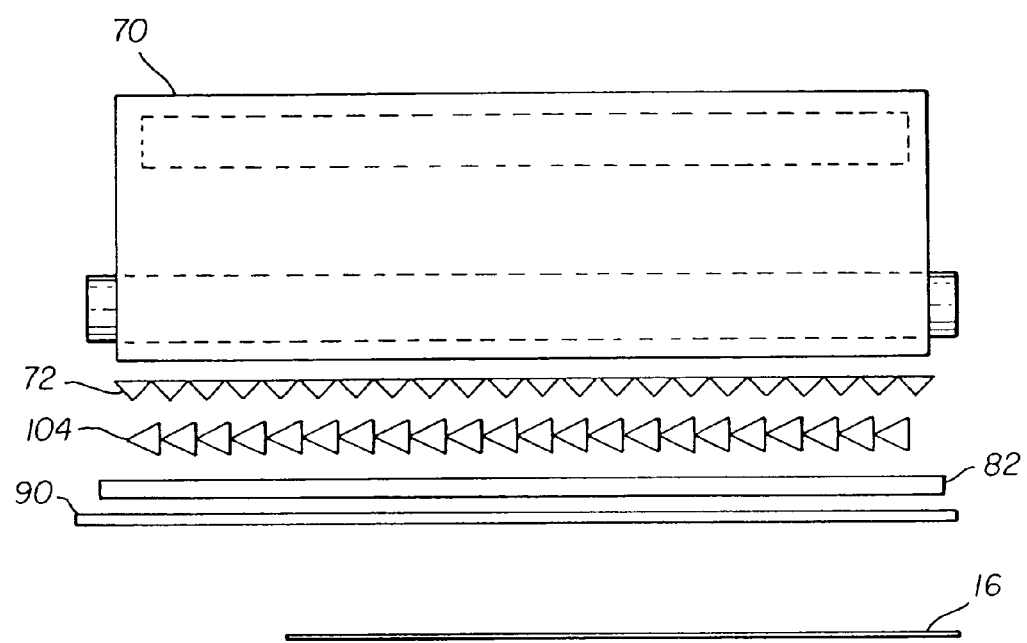
FIG. 9 is a front view showing a divertive prism array when in the 90-degree configuration.

Referring to the front view of FIG. 7a and corresponding side view of FIG. 7b, there is shown the configuration of irradiation apparatus 60 for the 90-degree configuration used within second irradiation station 20b. With respect to the view of FIG. 7a, the direction of movement of web 16 is out from the page. Referring to the corresponding side view of FIG. 7b, irradiation apparatus 60 is not tilted at an angle relative to the surface of web 16. However, the angle of incident light must be obliquely diverted in the cross-web direction, as described subsequently, either by using a divertive prism array 104 as is shown in FIGS. 7b and 9, or by changing the angular orientation of louver array 80, as is shown in FIG. 8a.

Reducing Angular Divergence

Figure 8B:
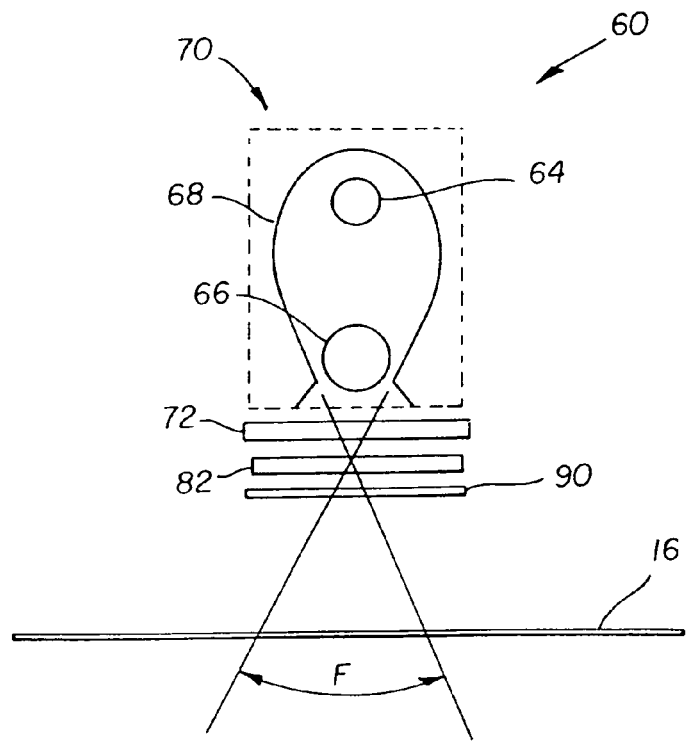
FIG. 8b is a cross-sectional side view of an irradiation apparatus for a 90-degree configuration showing the angular divergence constraints in the direction of web movement.

One function of hood assembly 70 is to minimize the angular divergence of light incident on polarizer 90. Referring to FIG. 8b, there is shown a side view of irradiation apparatus 60 in the 90-degree configuration. The arrangement of light source 64 and reflector 68 within hood assembly 70 effectively constrains the angular divergence of exposure light in the web travel direction, as indicated by angle F. In a preferred embodiment, angle F is constrained to approximately 45 degrees. This angular constraint in the web travel direction applies for both 0-degree and 90-degree configurations.

Control of angular divergence in the orthogonal direction, across the web, can be performed by a number of different structures, singly or in combination, depending on the 0- or 90-degree configuration that is used. The simplest means for control of angular divergence is an opaque louver array 80, with louvers vertically disposed as shown in FIG. 5. With louver array 80 arranged as shown in FIG. 5, angular divergence is constrained as a factor of louver spacing.

Figure 12A:
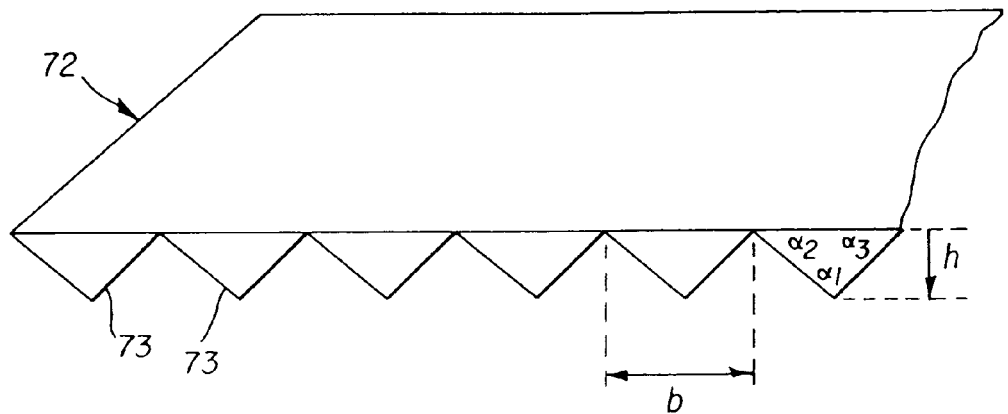
FIG. 12a is a perspective top view of a prism array.
Figure 12B:
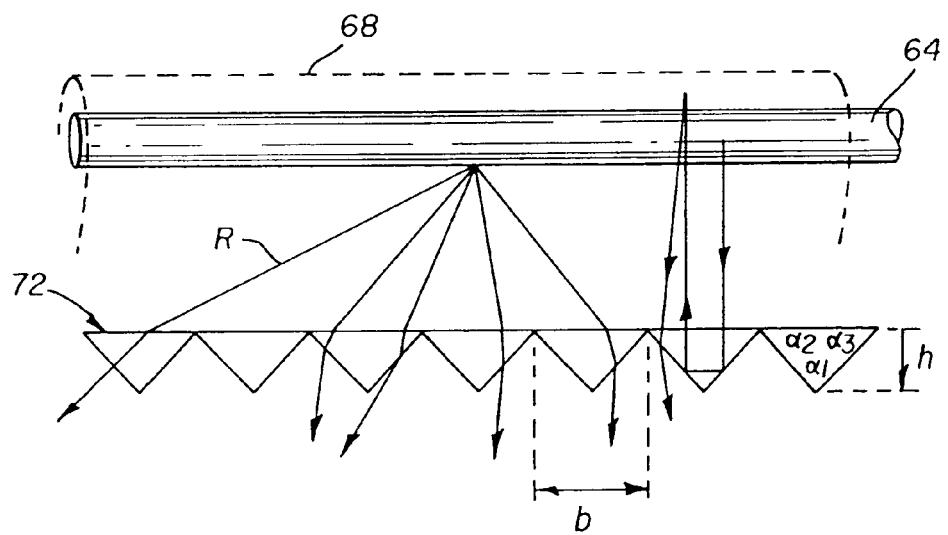
FIG. 12b is a representative front view showing the operation of the prism array to reduce angular divergence.

An alternate scheme for control of angular divergence across web 16 uses prism array 72 as shown in FIGS. 12a and 12b. Prism array 72 comprises a sequence of symmetric prisms 73. Each prism 73 has the same dimensions and is extended lengthwise along the direction of travel of web 16. In a preferred embodiment, height h is approximately 0.5 in., base B is approximately 1 in.; angle $\alpha_1$ is 90 degrees, angles $\alpha_2$ and $\alpha_3$ are each nominally 45 degrees. Other dimensional characteristics could be applied; prisms 73 could alternately vary in dimension along prism array 72. Prisms may have the linear arrangement of FIG. 12a or some modified arrangement, such as staggering of individual prisms 73 to minimize patterning effects. Prism array 72 is most effective in the 90-degree configuration shown in FIG. 8a, boosting light efficiency in this configuration.

FIG. 12b shows the operation of prism array 72 as it cooperates with light source 64 and reflector 68. Rays R from any point on light source 64 are emitted over a broad range of angles. Upon passing through prism array 72, rays R are refracted to narrow the range of angles. As can be seen in FIG. 12b, the reflective properties of prisms 73 are also employed, in conjunction with reflector 68, to redirect and thereby re-use some of the light incident at a range of angles.

The combined effect of controlling angular divergence in the travel direction of web 16 and across web 16 constrains the angular extent of the light cone from any point on light source 64 to polarizer 90. With a narrower range of incident light angles, improved performance of polarizer 90 is obtained. However, it is significant to note that, due to the performance characteristics of polarizer 90 in the preferred embodiment, it is not required that light from light source 64 be collimated.

It should be noted that there can be a number of adaptations of the louver array 80 arrangement shown in FIG. 5. For example, where an irradiation station 20a or 20b comprises multiple irradiation apparatus 60 in series, it may be preferable that, with respect to the direction of travel of web 16, louvers in one irradiation apparatus 60 be offset from louvers in a paired irradiation apparatus 60. Unequal louver spacing can also be used.

Directing Light at Desired Angle of Incidence

Figure 10:
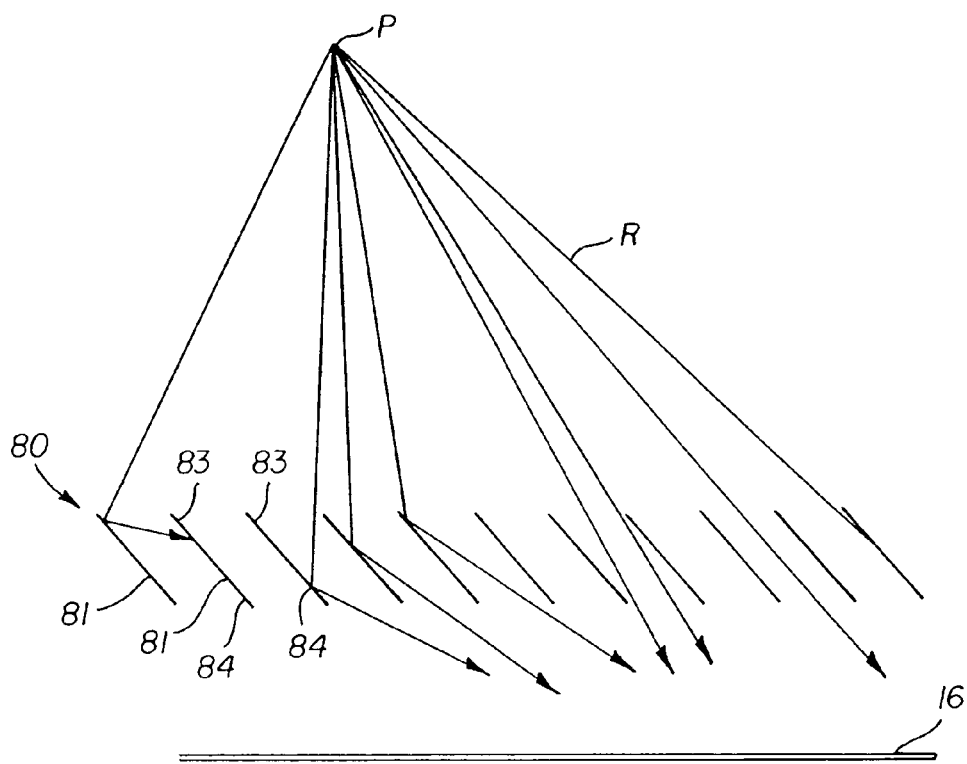
FIG. 10 is a representative front view showing the light directing operation of the louver array.

For 0-degree alignment at first irradiation station 20a, tilting hood assembly 70 provides a desired angle for exposure radiation, directed down the length of web 16 as is shown in the side view of FIG. 6b. For 90-degree alignment at second irradiation station 20b, however, the desired angle of incidence is in an essentially orthogonal direction, across the width of web 16. To divert the exposure radiation from hood assembly 70 in this direction, there are a number of alternatives. In a preferred embodiment, louver array 80 is disposed as shown in FIG. 10. Here, individual louvers 81 are at a suitable angle for directing light rays R from a source point P toward web 16. With this configuration, each louver 81 has a reflective side 83 and a non-reflective side 84. Rays R at the optimal angle simply pass through louver array 80. Rays R incident upon reflective side 83 are thereby diverted, where possible, to a more suitable incident angle. Other rays R that cannot be readily diverted are absorbed at non-reflective side 84. As a result, the range of incidence angles obtained is acceptable for alignment in the 90-degree orientation. Louvers 81 are spaced to limit the divergence angle of incident light supplied from light source 64.

Figure 11:
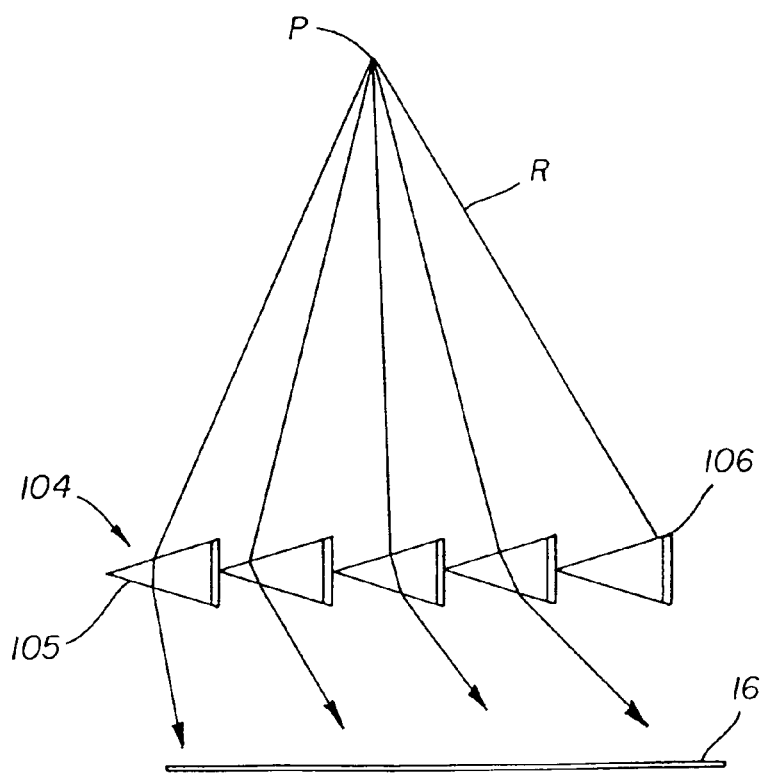
FIG. 11 is a representative front view showing the light directing operation of the divertive prism array.

An alternative arrangement for diverting exposure irradiation from hood assembly 70 uses divertive prism array 104 as shown in the front view of FIG. 9. Referring to FIG. 11, the operation of divertive prism array 104 is represented. Here, individual prisms 105 each divert incident light rays R by refraction, redirecting the light at a suitable incident angle. Each prism 105 comprises an opaque surface 106 for absorbing rays R that cannot be satisfactorily redirected. Opaque surface 106 is typically an absorptive coating. Dimensionally, prisms 105 may be the same size or may vary in size across divertive prism array 104.

Figure 13:
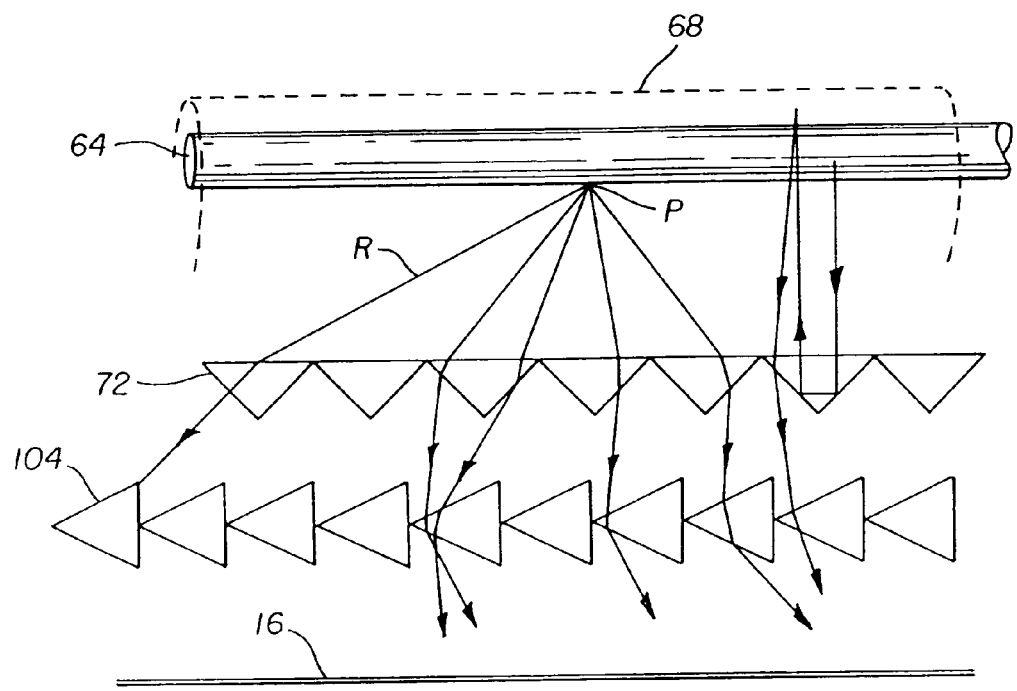
FIG. 13 is a representative front view showing the combined operation of the prism array and the divertive prism array.

Referring to FIG. 13, there is shown, from a front view, how divertive prism array 104 cooperates with prism array 72 in an alternate embodiment. Here, prism array 72 constrains angular divergence of rays R from source point P, as was described with reference to FIG. 12b. Rays R are then redirected at a suitable incident angle for alignment in the preferred orientation.

Configuration of Polarizer 90

Referring back to FIGS. 16a through 16d, the significance of maintaining a uniform principal axis of polarization 126 at polarizer 90 can be appreciated. When polarizer 90 has this property, incident light can vary over a range of angles without affecting the axis of polarization that is provided.

Figure 14A:
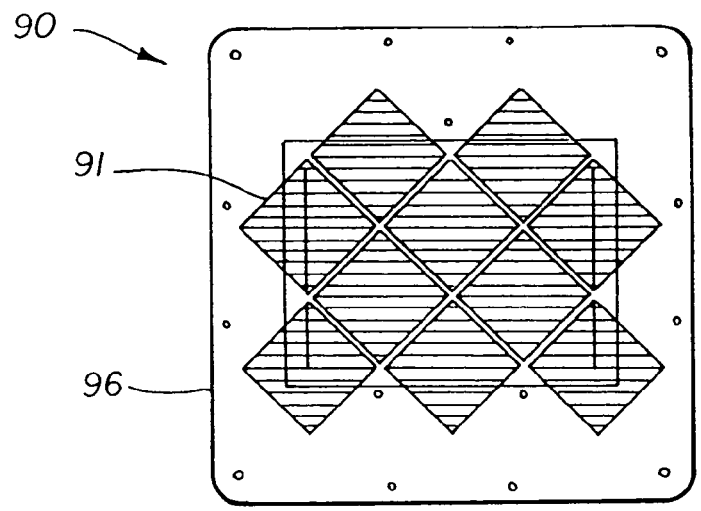
FIG. 14a is a plane view showing a wire grid polarizer array.
Figure 14B:
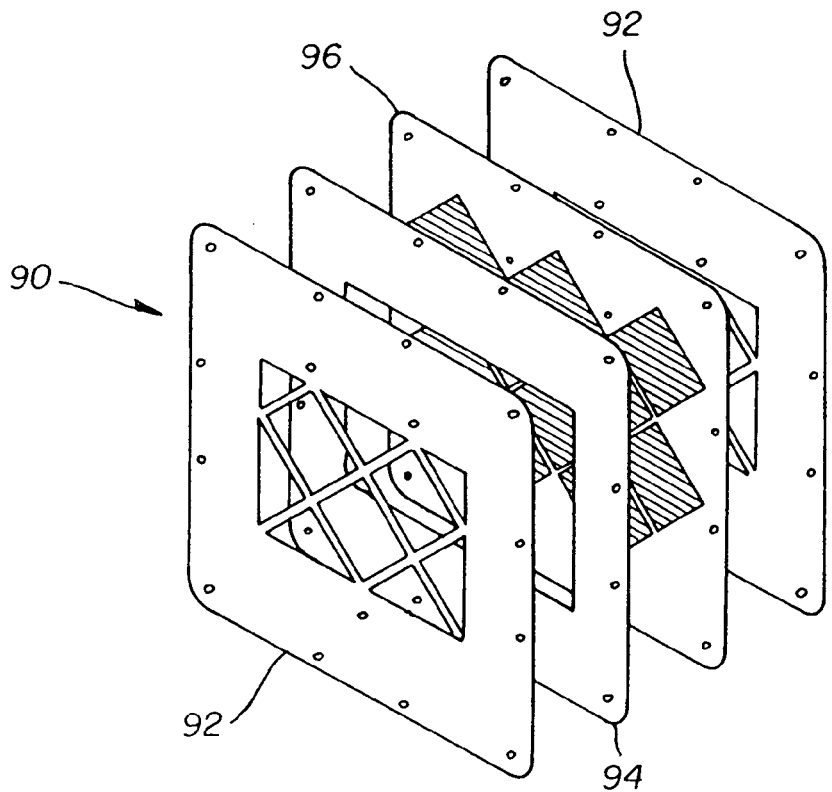
FIG. 14b is a perspective view showing how a wire grid polarizer array is assembled, in a preferred embodiment.
Figure 16B:
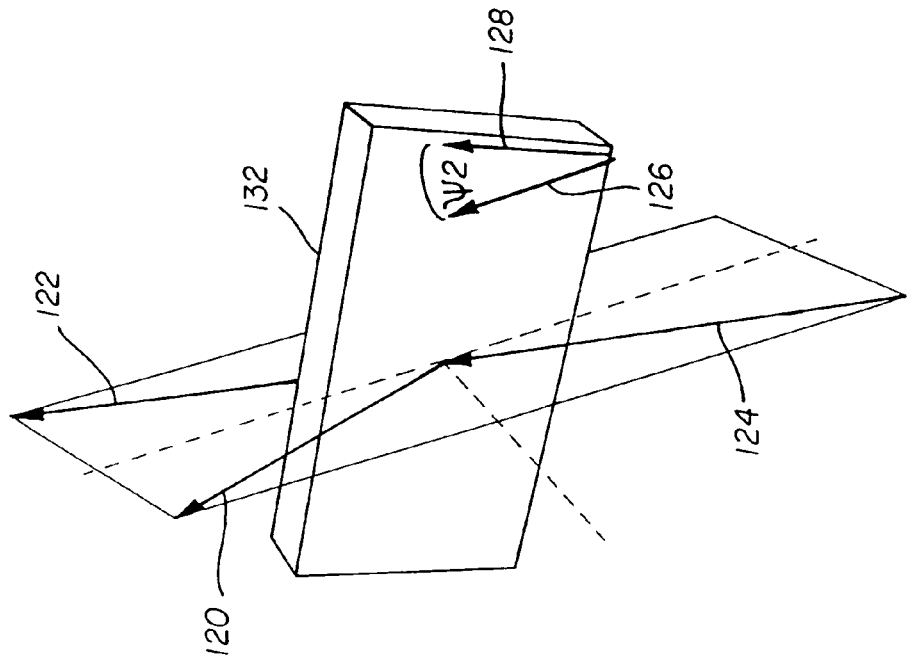
FIGS. 16a and 16b graphically represent the angular response of a Brewster plate polarizer to light at different incident angles.
Figure 16A:
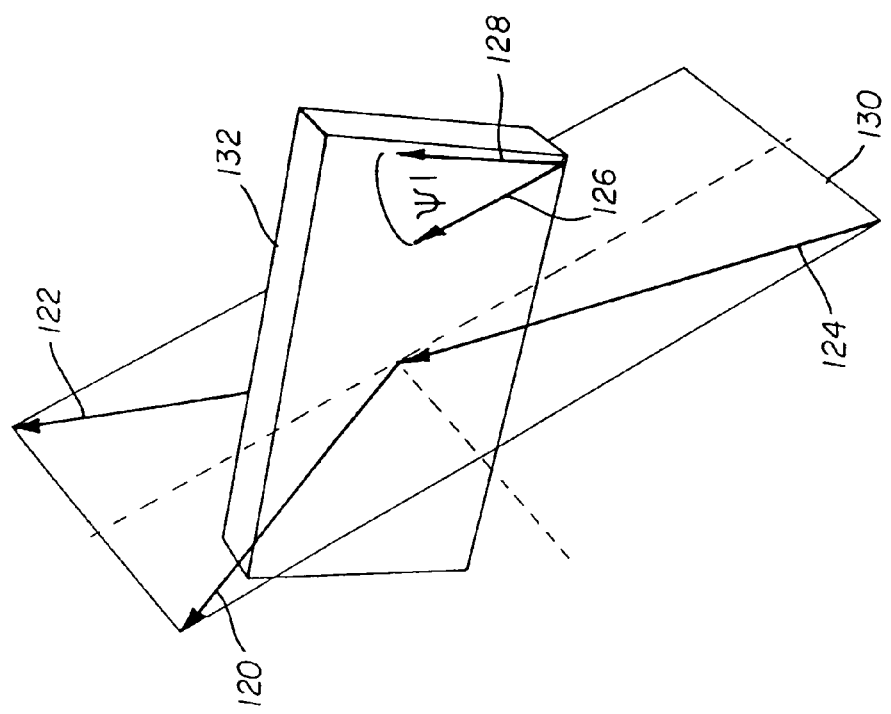
Figure 16D:
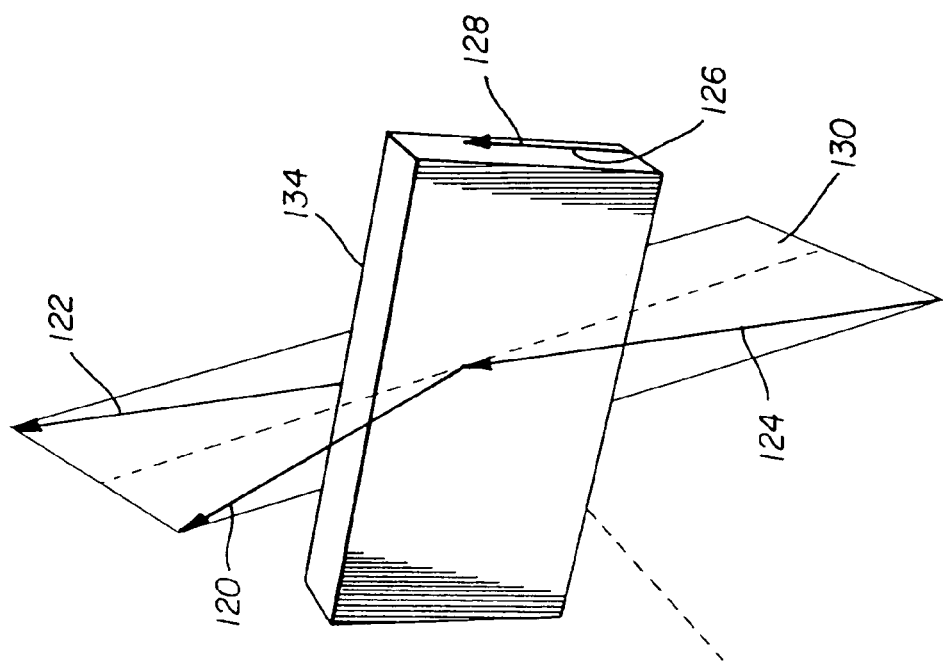
FIGS. 16c and 16d graphically represent the angular response of wire grid polarizers and Beilby-layer polarizers for comparison with FIGS. 16a and 16b.
Figure 16C:
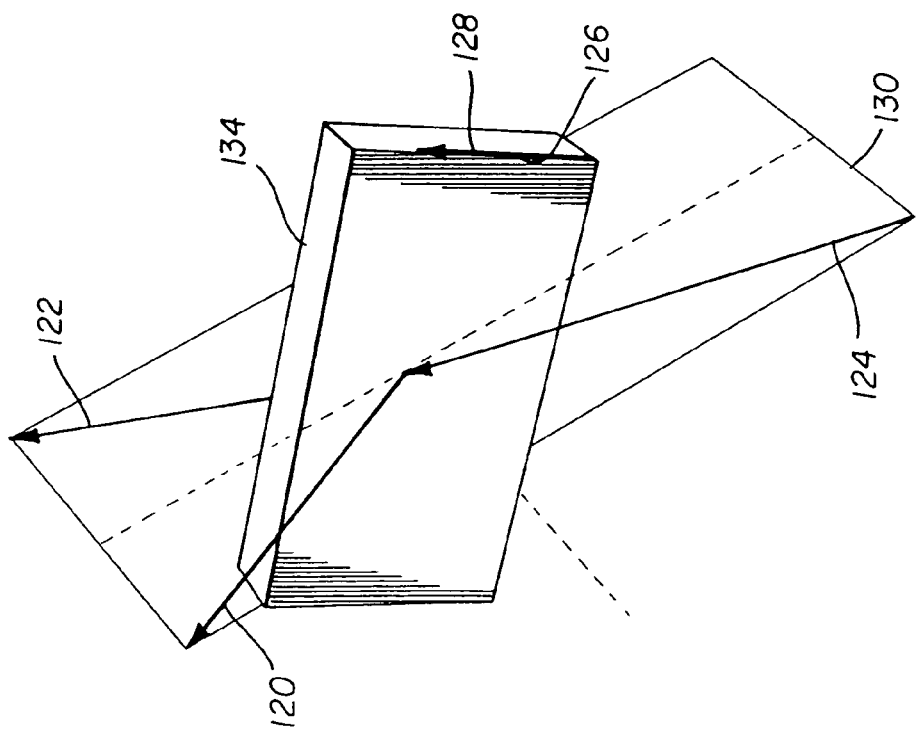

As a general rule, polarizer 90 works best when used with light having a reduced divergence angle and when placed in close proximity to web 16. Referring to FIGS. 14a and 14b, there is shown a plane view and an exploded view, respectively, of polarizer 90 in a preferred embodiment. Polarizer segments 91 are wire grid polarizers, typically three inch square in a preferred embodiment, tiled together as shown. Polarizer 90 employs a number of polarizer segments 91, preferably disposed at an angle relative to the movement of web 16. The angular offset compensates for possible streaking effects from boundaries between individual polarizer segments 91. A grid frame 96 and a cover frame 94 are used to hold polarizer segments 91 in place, sandwiched between masks 92.

With the arrangement of FIGS. 14a and 14b, polarizer 90 is rotatable. That is, the complete polarizer 90 assembly can be rotated to effectively change the principal axis of polarization with respect to the exposure zone of web 16. Alternately, individual polarizer segments 91 can be rotated so that polarizer 90 can be adapted to provide a range of angles.

Wire grid polarizers are used as polarizer segments 91 in a preferred embodiment due to their capability to withstand high temperatures and suitable polarization characteristics. Generally, polarization of 3:1 or better is acceptable; 5:1 provides a preferred ratio for alignment. Wire grid polarizers offer advantages due to their inherent heat resilience and reduced thickness. Because these devices are generally less sensitive to angular variation than are Brewster plate polarizers or other polarizer devices, wire grid polarizers do not require collimated light. Additionally, because these devices are reflective, some amount of unused light can be reflected back and, potentially, re-used. Wire grid polarizers can be easily oriented to provide 0-degree and 90-degree alignment simply by rotating the wire direction of polarizer segments 91 within the plane of polarizer 90.

Other types of polarizers 90 could be used, provided they are capable of operating under relatively high temperature conditions. Brewster plates made of fused silica or quartz could also be used for alignment in the movement direction of web 16, however, size and weight constraints limit the feasibility of such a solution for large scale irradiation. It would also be difficult to maintain a uniform principal axis of polarization when using Brewster plate devices. Moreover, as is noted in the background section of this application, a Brewster plate polarizer would not be well-suited for cross-web irradiation, particularly where a long-arc lamp is used as light source 64. Interference-type polarizers that also employ Brewster plate principles could alternately be used; however, these polarizers are not dimensionally advantageous and are also poorly suited for cross-web irradiation.

An alternate type of polarizer segment 91 could employ a Beilby-layer polarizer, such as those available from Sterling Optics, Inc. A matrix arrangement similar to that shown in FIGS. 14a and 14b would also be practicable when using Beilby-layer devices. The corresponding polarizer segments 91 could be larger when using these devices than with wire grid polarizers.

With the 90-degree alignment configuration of FIGS. 7a and 7b, polarizer 90 is optimally positioned parallel to the surface of web 16 within the exposure zone. With the 0-degree alignment configuration of FIGS. 6a and 6b, polarizer 90 may be parallel to the base of hood assembly 70, parallel to web 16, or at some intermediate angle. There may be some advantages to using angles that maximize levels of irradiance and provide highly uniform polarization, particularly with the 0-degree arrangement. As was described with reference to FIGS. 16c and 16d, wire grid and Beilby-layer polarizers maintain a uniform principal axis of polarization for light over a range of incident angles. Because of this, polarizer 90, when fabricated using these devices, can be tilted about an axis parallel to the length of light source 64 without noticeable effect on uniformity of polarization direction. Tilt angles of up to about 30 degrees with respect to the surface of web 16 can be used without affecting the performance of polarizer 90.

Alternate Embodiments for Light Source 64

In a preferred embodiment, light source 64 is a medium-pressure mercury arc lamp. These devices can have a power input approaching or exceeding 400 watts/inch of lamp length and have a favorably long lamp life. This approach provides the advantages of using a single bulb that has relatively long useful life (1,000 hours, nominal) and can be readily changed with minimal disruption to equipment.

Figure 15:
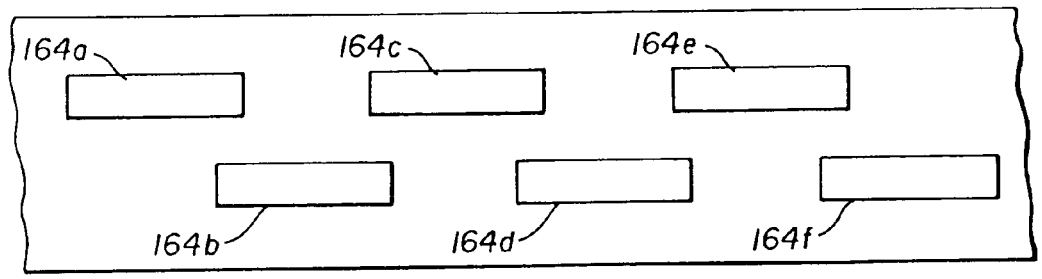
FIG. 15 is a top view of a light source alternative, showing an overlap pattern using an array of lamps as light source.

Alternatives for light source 64 include mercury short arc lamps, typically having 10–15 kW input. However, mercury short arc lamps can be more expensive and typically have a shorter useful life than medium-pressure arc lamps. Referring to FIG. 15, there is shown an arrangement using multiple light sources 164a, 164b, 164c, 164d, 164e, and 164f. In order to span the width of web 16, light sources 164a, 164b, 164c, 164d, 164e, and 164f are grouped, staggered to leave no perceptible gaps or boundaries.

Embodiments for Filter 82

Filtering of the UV light helps to attenuate harmful wavelengths and to remove unwanted light and heat from the system. UV-C light (200–270 nm), for example, appears to be detrimental to LPP crosslinking needed for alignment. One method for removing UV-C wavelengths employs an absorbing plate of WG 280 for example. UV-A, visible, and infrared light are considered superfluous, however, to minimize heating and other unwanted side effects, the preferred embodiment uses an optional filter 82 to remove this unwanted light from the system. Additional filtering is also provided near light source 64 by cooling tube 66, particularly where water is used, as noted above.

In a preferred embodiment, filter 82 follows louver array 80 and prism array 72 in the optics path. With this arrangement, filter 82 accepts incident light over a more controlled angle of divergence. However, filter 82 could be positioned at alternate points in the optics path.

Alternative Embodiments for Processing Apparatus 10

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, while hood assembly 70 is at right angles to the direction of web 16 movement in the preferred embodiment, other arrangements are possible. For example, hood assembly 70 could be disposed at a diagonal relative to web 16. Other types of light sources could be employed, providing that a generally uniform irradiation is obtained.

Irradiation apparatus 60 can also be adapted to suit requirements for obtaining the desired direction of polarization and pretilt. In a preferred embodiment, irradiation apparatus 60 used for the 90-degree configuration uses both prism array 72 and louver array 80. However, in the 0-degree configuration, irradiation apparatus 60 does not use louver array 80. It can be seen that other arrangements are possible, so that each irradiation apparatus 60 can be equipped with either louver array 80 or prism array 72 or with both louver array 80 and prism array 72. For 90-degree configurations, louver array 80 may be angled and configured as described earlier with reference to FIG. 10. Alternately, the combination using both prism array 72 and divertive prism array 104 could be used.

In the preferred embodiment, LPP layers are orthogonally aligned in the direction of travel of web 16 and in the cross-web direction. Alternately, a different set of orthogonal angles could be used. For example, alignment angles could be at 45-degrees with respect to the edges of web 16.

Alternate system arrangements for processing apparatus 10 could employ a single irradiation apparatus 60 for processing a roll of media with one alignment layer, aligned in a 45-degree orientation. A second alignment layer having 135-degree alignment could be fabricated separately using the same irradiation apparatus 60. Then, both orthogonal layers could be laminated together in an orthogonal arrangement.

Additional light conditioning components could be used in the optics path, such as for additional filtering. Optionally, a diffuser, such as a holographic diffuser, could be employed for improving uniformity of irradiance.

It can be seen that irradiation apparatus 60 of the present invention provides a compact, energy-efficient device for exposing a wide-area substrate with light radiation having a uniform polarization direction. Adaptable for providing incident light in orthogonal directions, irradiation apparatus 60 can be advantageously deployed in a roll-to-roll manufacturing environment for fabricating web-fed multilayered liquid crystal media having orthogonally oriented alignment layers.

Thus, what is provided is and apparatus and method for processing a liquid crystal display compensation film provided as a web-fed substrate.

PARTS LIST

- 10 Processing apparatus
- 12 Source roll
- 14 Finished goods roll
- 16 Web
- 18 Clear substrate layer
- 20a First irradiation station
- 20b Second irradiation station
- 22 LPP1 layer
- 24 LCP1 layer
- 26 LPP2 layer
- 28 LCP2 layer
- 30 LPP1 layer application station
- 32 LCP1 layer application station
- 34 LPP2 layer application station
- 36 LCP2 layer application station
- 40a First curing station
- 40b Second curing station
- 60 Irradiation apparatus
- 62 Air tube
- 64 Light source
- 66 Cooling tube
- 68 Reflector
- 70 Hood assembly
- 71 Coating
- 72 Prism array
- 73 Prisms
- 74 Light conditioning assembly
- 80 Louver array
- 81 Louver
- 82 Filter
- 83 Reflective side
- 84 Non-reflective side
- 90 Polarizer
- 91 Polarizer segment
- 92 Mask
- 94 Cover frame
- 96 Grid frame
- 100 Optic axis
- 102 Optic axis
- 104 Divertive prism array
- 105 Prism
- 106 Opaque surface
- 120 Reflected beam
- 122 Transmitted beam
- 124 Incident beams
- 126 Principal axis of polarization
- 128 Reference direction
- 130 Meridional plane
- 132 Brewster plate polarizer
- 134 Wire grid polarizer
- 164a Light source
- 164b Light source
- 164c Light source
- 164d Light source
- 164e Light source
- 164f Light source
- 190 Discotic structures
- 192 Plane of substrate

What is claimed is:

1. An optical exposure apparatus for forming an alignment layer onto a web-fed substrate, the apparatus comprising:
   - (a) an irradiation apparatus for directing an incident ultraviolet light toward the substrate at a predetermined average angle of inclination, over an exposure zone spanning the full width of the substrate, comprising:
     - (a1) a light source for providing said incident ultraviolet light;
     - (a2) a plurality of louvers for directing said incident ultraviolet light at said predetermined average angle of inclination relative to the substrate surface, each said louver having a reflective side and an opaque side, the long axis of each said louver aligned substantially parallel to the web movement direction; and
   - (b) a polarizer disposed between said plurality of louvers and the substrate and rotatably oriented to maintain a principal axis of polarization having a predetermined orientation with respect to the web movement direction, said principal axis of polarization independent of said angle of inclination.

2. An optical exposure apparatus according to claim 1 wherein said plurality of louvers are tilted at an oblique angle with respect to the surface of the substrate.

3. An optical exposure apparatus according to claim 1 further comprising a filter disposed between said plurality of louvers and the substrate.

4. An optical exposure apparatus for applying radiant energy onto a web-fed substrate, the apparatus comprising:
   - (a) an irradiation apparatus for directing an incident ultraviolet light toward the substrate at a predetermined average angle of inclination, over an exposure zone spanning the full width of the substrate, comprising:

(a1) a light source for providing said incident ultraviolet light;

(a2) a first prism array for providing a reduced divergence angle to said incident ultraviolet light;

(a3) a second prism array for directing said incident ultraviolet light having said reduced divergence angle at said predetermined average angle of inclination relative to the substrate surface; and (b) a polarizer disposed between said second prism array and the substrate and rotatably oriented to maintain a principal axis of polarization having a predetermined orientation with respect to the web movement direction, said principal axis of polarization independent of said angle of inclination.

5. An optical exposure apparatus according to claim 4 further comprising a filter disposed between said second prism array and the substrate.

6. A method for fabricating a multilayer web-fed substrate having a first liquid crystal film layer aligned along a first optical axis and a second liquid crystal film layer aligned along a second optical axis orthogonal to said first optical axis, the method comprising:

(a) applying a first alignment layer to the substrate to form a multilayer film;

(b) irradiating said first alignment layer with incident ultraviolet light directed through a first polarizer having a first principal axis of polarization at a first angle relative to the surface of the multilayer film to provide alignment in a first direction;

(c) applying a second alignment layer to said multilayer film;

(d) irradiating said second alignment layer with incident ultraviolet light directed through a second polarizer having a second principal axis of polarization at a second angle relative to the surface of the multilayer film, said second angle orthogonal to said first angle to provide alignment in a second direction; and wherein the step of irradiating said first alignment layer comprises the step of disposing an array of louvers between a source of illumination and the substrate.

7. A method for fabricating a multilayer web-fed substrate according to claim 6 wherein said first polarizer is an array comprising individual wire grid polarizer segments.

8. A method for fabricating a multilayer web-fed substrate according to claim 6 wherein said first polarizer is an array comprising individual Beilby-layer polarizer segments.

9. A method for fabricating a multilayer web-fed substrate having a first liquid crystal film layer aligned along a first optical axis and a second liquid crystal film layer aligned along a second optical axis orthogonal to said first optical axis, the method comprising:

(a) applying a first alignment layer to the substrate to form a multilayer film;

(b) irradiating said first alignment layer with incident ultraviolet light directed through a first polarizer having a first principal axis of polarization at a first angle relative to the surface of the multilayer film to provide alignment in a first direction;

(c) applying a second alignment layer to said multilayer film;

(d) irradiating said second alignment layer with incident ultraviolet light directed through a second polarizer having a second principal axis of polarization at a second angle relative to the surface of the multilayer film, said second angle orthogonal to said first angle to provide alignment in a second direction; and wherein the step of irradiating said second alignment layer comprises the step of using a first array of prisms to provide a reduced divergence angle and using a second array of prisms to bend the light path to provide incident light at a predetermined angle.

10. A method for fabricating a multilayer compensation film having a first liquid crystal film layer aligned along a first optical axis and a second liquid crystal film layer aligned along a second optical axis orthogonal to said first optical axis, the method comprising:

(a) applying a first alignment layer to a first substrate to form a first multilayer portion;

(b) irradiating said first alignment layer with incident ultraviolet light directed through a first polarizer having a first principal axis of polarization at a first angle relative to the surface of the first multilayer portion to provide alignment in a first direction;

(c) applying a second alignment layer to a second substrate to form a second multilayer portion;

(d) irradiating said second alignment layer with incident ultraviolet light directed through a second polarizer having a second principal axis of polarization at a second angle relative to the surface of the second multilayer portion to provide alignment in a second direction; and (e) laminating said first multilayer portion to said second multilayer portion to form said multilayer compensation film.

* * * * *